Aug. 4, 1925.  1,548,545

J. NIEDERHAUSER
APPARATUS FOR BALANCING THE AXIAL THRUST IN
SINGLE HELICAL TOOTHED WHEEL GEARING
Filed April 19, 1923

Inventor:
J. Niederhauser

Patented Aug. 4, 1925.

1,548,545

UNITED STATES PATENT OFFICE.

JAKOB NIEDERHAUSER, OF BADEN, SWITZERLAND, ASSIGNOR TO AKTIENGESELL-SCHAFT BROWN, BOVERI AND CIE., OF BADEN, SWITZERLAND.

APPARATUS FOR BALANCING THE AXIAL THRUST IN SINGLE HELICAL TOOTHED WHEEL GEARING.

Application filed April 19, 1923. Serial No. 633,313.

*To all whom it may concern:*

Be it known that I, JAKOB NIEDERHAUSER, a citizen of the Swiss Republic, residing at No. 28 Martinsbergstrasse, Baden, Switzerland, have invented certain new and useful Improvements in Apparatus for Balancing the Axial Thrust in Single Helical Toothed Wheel Gearing, of which the following is a specification.

The axial thrust in single helical toothed wheel gearing constructed hitherto has been taken either directly by the driving machine or by the driven machine, or by separate thrust bearings, so that finally the bearing casing has had to take the thrust. Thrust bearings occasion however a not inconsiderable increase in the cost of such gearing.

In order to do away with these costly separate thrust bearings, recourse has been had to the use of double helical toothed wheel gearing wherein each wheel is constructed as if it were combined of two helical half wheels arranged side by side with the teeth of each half-wheel inclined oppositely to the teeth of the other half-wheel.

In such double helical wheels the unavoidable small errors of pitch which are never uniform in both halves of the wheels, cause corresponding differences in the peripheral forces, and consequently also in the axial thrusts of the two halves of the gear, with the result that the wheels, in seeking to establish a balance between the two axial thrusts are continually impelled axially to-and-fro, which is detrimental to the steady working of a gear of this nature.

It is now proposed to revert to the use of the cheaper and more reliable single helical toothed wheels, and the present invention has for its object to provide improved apparatus by means of which the axial thrusts of single helical toothed wheels meshing with one another are balanced directly, that is to say, within the gearing itself, taken as a self-contained mechanism, by means of separate rotary surfaces which are opposed to one another and revolve together and serve as thrust surfaces for the revolving bodies.

The invention will now be more fully described with reference to the accompanying drawings which illustrate various constructional examples thereof.

Figure 1:
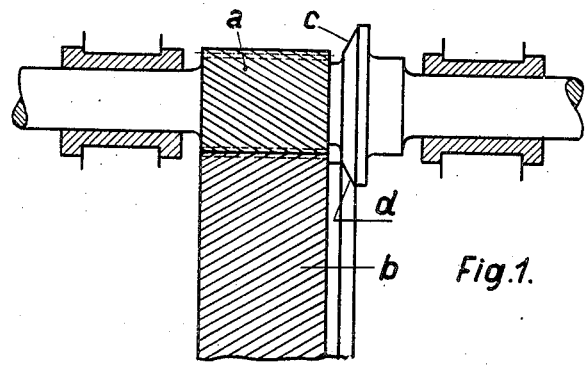
Fig. 1 is a fragmentary side view of two meshing single helical toothed wheels adapted to transmit power in one direction only and provided with my improvements.

In Figure 1 $a$ is a wheel driving a larger wheel $b$; $c$ is a separate thrust surface provided on the wheel $a$, and $d$ is a thrust surface provided on the wheel $b$. The two separate thrust surfaces $c$ and $d$ co-operate together to take the respective axial thrusts of the two wheels.

In working, the teeth will make a screwing movement, until these thrust surfaces $c$ and $d$ bear against each other, whereupon the axial thrust of the one wheel will oppose directly the axial thrust of the other wheel, and thus the two axial thrusts will balance each other completely. These axial thrusts are consequently not transmitted in any way to the bearing casing, as is the case when thrust bearings are employed.

Figure 2:
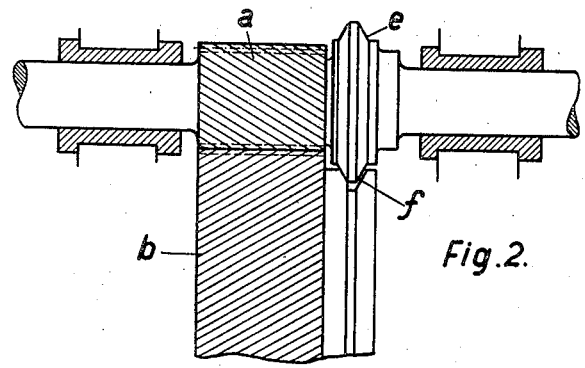
Fig. 2 is a similar view of a modified arrangement employed for transmitting power in both directions of rotation.

When a gear of this kind is to be employed for transmitting power in both directions of rotation, it is preferred to use the modified arrangement illustrated by way of example in Figure 2. In this modified arrangement the thrust surfaces are shown formed on inter-engaging collars which have, in addition to the thrust surfaces $c$ and $d$, further surfaces $e$ and $f$ respectively which are intended to take the oppositely directed thrusts. It is to be understood that these surfaces $e$ and $f$ may also be arranged in another manner, for example, on the opposite side of the pair of wheels.

When jolts occur in the working of such a gear the thrust rings or thrust collars are preferably made resilient, namely, these rings or collars are so constructed as to be resilient of themselves, or elastic intermediate members may be arranged between them and their respective wheels.

Although the running surfaces may be situated in one plane, yet, in order to get a better bearing film of oil, it is preferred to make such running surfaces of convex shape, for instance, by making them of conical shape as shown in the drawings. The inter-engaging running or thrust surfaces of a pair of helical wheels will then make contact with each other only along one line, the contacting surfaces being separated from each other both before and after the line of contact. The distances between the working surfaces produce conditions similar to those existing in Michell or Kingsbury thrust block bearings, thus permitting high pressures between the surfaces of the pinion and the wheel. The convex running surfaces ensure in this manner a very intensified lubrication of the thrust zone because the lubricant is forced between them in the form of a wedge of oil.

The relative velocities of the parts of the thrust surfaces rolling over or sliding over one another depend upon the distance of these parts from the pitch circle.

Figure 3:
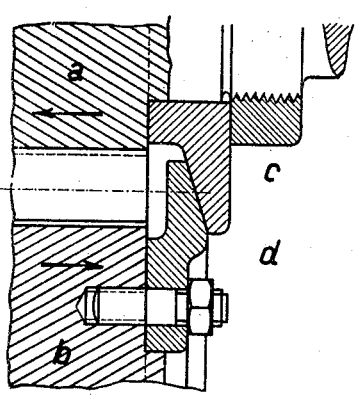
Figs. 3 and 4 are enlarged detail sectional views of other modified forms.

In order to keep these velocities low, the thrust zone may be arranged close to the pitch circles, as is shown for instance, in Figure 3.

Figure 4:
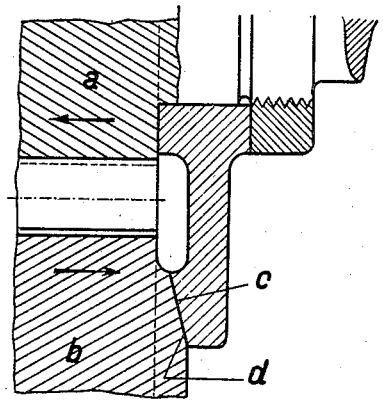

If, however, on the contrary, it is preferred to have a sliding motion, this can be attained by arranging these thrust surfaces outside or inside the pitch circles, as is indicated for instance, in Figure 4. The same reference letters are used in Figures 3 and 4, as in Figure 1.

For the purpose of avoiding "pitting" in the zone of purely rolling friction, namely, in the pitch circle zone, a groove may be provided at that point so as to interrupt the surfaces.

The present invention may be also adapted for use with subdivided rings of teeth.

What I claim is:—

1. Apparatus for balancing axial thrust in single helical toothed wheel gearing including in combination a pair of helical toothed gear wheels and a pair of interengaging thrust surfaces rotated by their respective wheels and facing one another in such a manner that axial end thrust due to rotation of the said pair of wheels is transferred to the engaging thrust surfaces.

2. Apparatus as claimed in claim 1, wherein one of the said thrust surfaces is formed on one end of one of the said wheels.

3. Apparatus as claimed in claim 1, wherein the said thrust surfaces are located on bodies of revolution integral with their said respective wheels.

4. Apparatus as claimed in claim 1, wherein the said thrust surfaces are located on bodies of revolution integral with their said respective wheels and are formed by generatrices inclined to the axes of their respective helical wheels.

In testimony whereof I have signed my name to this specification.

JAKOB NIEDERHAUSER.